United States Patent Office.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

CARBAZOL-YELLOW.

SPECIFICATION forming part of Letters Patent No. 401,634, dated April 16, 1889.

Application filed October 18, 1888. Serial No. 288,433. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of a Yellow Coloring-Matter or Dye-Stuff from Carbazol, of which the following is a specification.

This invention relates to the production of a new yellow coloring-matter, suitable for dyeing and printing, from carbazol, a hitherto waste by-product in the manufacture of pure or refined anthracene. The said coloring-matter belongs to the class of the so-called "diazo compounds," and results from the combination of one molecule of tetrazo-carbazol with two molecules of salicylic acid.

In carrying out this invention carbazol is first converted into dinitro-carbazol by allowing, for instance, about thirteen parts, by weight, of nitric acid of about 1.38 specific gravity gradually to run into a well-agitated mixture of about ten parts, by weight, of carbazol with about fifty parts, by weight, of glacial acetic acid at a temperature of about 80° centigrade. After the addition of nitric acid the temperature of the mixture is raised to about 100° centigrade and maintained thereat during the space of about half an hour. The result of the operation is then allowed to cool, when dinitro-carbazol will separate out in the form of a yellow crystalline powder, which is to be filtered and washed. Dinitro-carbazol thus obtained is now submitted to the action of reducing agents in order to convert the same into its corresponding diamido derivative. For this purpose the known reducing processes may be employed—such as, for instance, treatment with stannous chloride or with a mixture of tin and hydrochloric acid at about 100° centigrade; but, by preference, the action of zinc-dust in the presence of caustic alkalies is made use of in the following manner: About sixty-five parts, by weight, of dinitro-carbazol are intimately mixed with about three hundred parts, by weight, of water and about one hundred parts, by weight, of zinc-dust. The mixture thus prepared is then heated up to about 50° centigrade, and about two hundred and fifty parts, by weight, of caustic-soda liquor of about 1.38 specific gravity are gradually added to the well-agitated mixture. After the addition of caustic soda the temperature is raised to about 90° centigrade and maintained thereat for about eight hours, or until the conversion of dinitro-carbazol into diamido-carbazol has been completed, or nearly so. In order to separate the said diamido compound from the alkaline mixture, about one thousand parts, by weight, of water are then added. The undissolved residue, principally consisting of diamido-carbazol and unchanged zinc-dust or oxide of zinc, is filtered, washed, and treated with about five hundred parts, by weight, of hydrochloric acid of about 1.16 specific gravity, whereby a crystalline mixture of hydrochlorate of diamido-carbazol and of its chloride-of-zinc compound will be obtained, which is then to be filtered and pressed. A further purification may afterward be effected by dissolving the said saline compounds of diamido-carbazol in about fifteen hundred parts, by weight, of water and precipitating the filtered solution (which may be previously decolorized by means of animal charcoal) by the addition of about one hundred parts of crystallized sulphate of soda, when sulphate of diamido-carbazol, thus produced, will separate out in a pure and well-crystallized condition. The said saline compound is almost insoluble in pure water, but dissolves readily in water acidulated by a mineral acid. From its aqueous solution pure diamido-carbazol may be obtained upon the addition of an alkali, as a crystalline precipitate consisting of silverish-white lamina, hardly soluble in water and not entering into fusion at about 250° centigrade.

The final step in the process consists in the conversion of diamido-carbazol (or of its above-named saline compounds) into tetrazo-carbazol by the action of nitrous acid, immediately followed by the combination of the latter compound with salicylic acid, as above mentioned.

The following is an example of the manner in which the said operations may be carried out: About fifty parts, by weight, of the before-named sulphate of diamido-carbazol are intimately mixed with about sixty parts, by weight, of hydrochloric acid of about 1.16 specific gravity and with about one thousand parts, by weight, of water and about one thousand parts, by weight, of ice. The mixture thus produced is then diazotized by the addition of a solution of about fifty parts, by weight, of nitrite of soda in about one hundred and fifty parts, by weight, of water, and the solution of tetrazo-carbazol thus obtained is then immediately allowed to run into a well-agitated solution of about forty-seven and a half parts, by weight, of salicylic acid in about two thousand parts, by weight, of water and about one hundred and fifty parts, by weight, of caustic-soda liquor of about 1.38 specific gravity. The mixture immediately assumes an intense red color, which, within about twenty-four hours, turns into a yellowish-brown. This point being arrived at, the mixture is to be heated to ebullition, and common salt is added in order to precipitate the yellow coloring-matter, which upon cooling separates out as a brown crystalline precipitate, and may then be filtered, washed, pressed, and used for dyeing and printing either in the state of a paste or of a dry powder.

The yellow coloring-matter prepared as above described is the sodium salt of an acid azo compound, which itself is insoluble in water, and may be thus precipitated from the yellowish-brown aqueous solutions of its alkaline salts by the addition of a stronger acid—say by hydrochloric acid in the form of a dark bluish-green precipitate, soluble in concentrated sulphuric acid, with a bright bluish-purple color. The coloring-matter possesses the property of imparting in its alkaline solution a bright and intense yellow color to cotton without the aid of mordants.

Wool and other animal fiber may be dyed a bright and fast yellow either in a neutral or acidified bath of the dye-stuff.

What I claim as new, and desire to secure by Letters Patent, is—

As a new product, the yellow coloring-matter or dye-stuff hereinbefore described, which results from the combination of one molecule of tetrazo-carbazol with two molecules of salicylic acid, and which has the following properties: In its uncombined state it forms a powder of a dark bluish-green color which is insoluble in water, but dissolves in concentrated sulphuric acid with a bright bluish-purple color; its sodium salt when dried forms a powder of a brown color, and in its alkaline solution it imparts to cotton a bright and intense yellow color without the aid of mordants; it dyes wool and other animal fiber a bright and fast yellow either in a neutral or acidified bath.

In testimony whereof I have hereunto set my hand in the presence of two subscribing witnesses.

RENÉ BOHN.

Witnesses:
AUGUST HAUSER,
JOHANNES BÜTTNER.